United States Patent [19]

Bruno et al.

[11] Patent Number: 5,724,461
[45] Date of Patent: Mar. 3, 1998

[54] POLARIZATION-INSENSITIVE DEMULTIPLEXER AND A METHOD OF MANUFACTURE

[75] Inventors: Adrien Bruno, Palaiseau; Catherine Ramus, Vitry, both of France

[73] Assignee: France Telecom, France

[21] Appl. No.: 627,081

[22] Filed: Apr. 3, 1996

[30] Foreign Application Priority Data

Apr. 5, 1995 [FR] France ............................ 95 04031

[51] Int. Cl.$^6$ ............................................. G02B 6/126
[52] U.S. Cl. ........................... 385/11; 385/28; 385/43; 385/131
[58] Field of Search ........................... 385/11, 14, 15, 385/27–30, 39, 43, 129–131

[56] References Cited

U.S. PATENT DOCUMENTS

| | | | |
|---|---|---|---|
| 4,273,411 | 6/1981 | Alferness | 385/28 X |
| 5,488,679 | 1/1996 | Wu | 385/15 |
| 5,515,461 | 5/1996 | Deri et al. | 385/30 |

*Primary Examiner*—John D. Lee
*Attorney, Agent, or Firm*—Blakely Sokoloff Taylor & Zafman

[57] ABSTRACT

The invention relates to a multi-wavelength filter having a bundle of optical waveguides formed on a common substrate and organized in such a manner that the wavelength response of the filter depends on the phase shifting to which light is subjected in the optical waveguides of the bundle. The filter is of the type in which polarization insensitivity is obtained by varying the birefringence of the optical waveguides. The optical waveguides of said bundle have the same birefringence in two end zones while in an intermediate zone they have birefringence that is different from that of said end zones. In the bundle of waveguides, the transitions between intermediate zone and the end zones extend along respective planes that are inclined relative to the direction of light propagation along the waveguides. The portions of the waveguides situated respectively in the intermediate zone and in an end zone are interconnected by means of respective mode matchers that are hourglass-shaped.

9 Claims, 3 Drawing Sheets

POLARIZATION-INSENSITIVE DEMULTIPLEXER AND A METHOD OF MANUFACTURE

The present invention relates to the general technical field of opto-electronics, and more precisely to a multi-wavelength filter of the type comprising a bundle of optical waveguides made on a common substrate and organized in such a manner that the wavelength response of the filter depends on the phase shifting to which light is subject when propagating along the waveguides.

BACKGROUND OF THE INVENTION

Various technological approaches have been proposed for obtaining polarization-independence in such a multi-wavelength filter.

In this respect, mention may be made of the publication "Polarization-independent in P-based phased array wavelength demultiplexer with flattened wavelength response" by L. H. Spiekmann et al., ECOC 94 conference.

Thus, as recalled in the above-specified article, proposals have been made for a structure in which a half-wave quartz plate is placed halfway along a bundle of optical waveguides so as to permute TE and TM modes of polarization.

In an article by Zirngibl et al., entitled "Polarization-independent 8×8 waveguide grating multiplexer on InP" published in Electronic Letters, Vol. 29, pages 201–202, January 1993, proposals have been made to use different orders for the TM and TE polarization modes.

Mention may also be made of a method consisting in spatial separating the TE and TM polarization modes in space as proposed by M. R. Amersfoort et el. in an article entitled "A phased-array wavelength demultiplexer with flattened wavelength response" published in Electronic Letters, Vol. 30, 1994.

Mention may also be made of a method consisting in spatial separation of the TE and TM polarization modes while taking different orders into consideration, as proposed by Spiekmann et al. in the first above-mentioned article.

In the article "Polarization-insensitive arrayed-waveguide wavelength multiplexer with birefringence compensating film" by Takahashi et al., published in IEEE Photonics Technology Letters, Vol. 5, No. 6, Jun. 6, 1993, proposals are made for depositing an amorphous silicon film having a special shape on the bundle of waveguides so as to obtain for each waveguide at least two portions of different birefringences.

Mention may also be made of a similar method described in U.S. Pat. No. 5,341,444 to Henry et al.

The above-cited known methods do not give entire satisfaction. The method that consists in applying a quartz plate suffers from the drawback of giving rise to coupling losses between the plate and the optical waveguides, and the performance of methods using different orders for the TE and TM polarization modes are limited in terms of the number of channels of different wavelengths that can be separated by the filter. Methods acting on the shapes of the optical waveguides to modify birefringence are technologically difficult to implement. Finally, methods consisting in modifying the birefringence of waveguides by depositing a surface film are unsuitable for monolithic integration of the filter.

OBJECTS AND SUMMARY OF THE INVENTION

An object of the present invention is to remedy the above-specified drawbacks by proposing a novel multi-wavelength filter that is polarization independent, that is easy to manufacture, suitable for monolithic integration, and capable of demultiplexing a large number of channels.

According to the invention, this is achieved by a filter of the type in which polarization-insensitivity is obtained by varying the birefringence of optical waveguides, which waveguides have different birefringences on at least two portions of their respective lengths. In characteristic manner, said portions are connected together by a mode matcher.

In a preferred embodiment of the invention, the optical waveguides of said bundle have the same birefringence in two end zones and birefringence in an intermediate zone that is different from that said end zones, with the transitions between each end zone and the intermediate zone extending over respective planes that are inclined relative to the direction of light propagation within the waveguides.

In a preferred embodiment of the invention, the mode matcher is hourglass-shaped.

In a preferred embodiment of the invention, said waveguide portions interconnected by the mode matcher have structures that are respectively of the diluted type and of the single heterostructure type.

BRIEF DESCRIPTION OF THE DRAWINGS

Other characteristics and advantages of the present invention appear on reading the following detailed description of non-limiting embodiments of the invention, and on examining the accompanying drawings, in which.

MORE DETAILED DESCRIPTION

Figure 1:
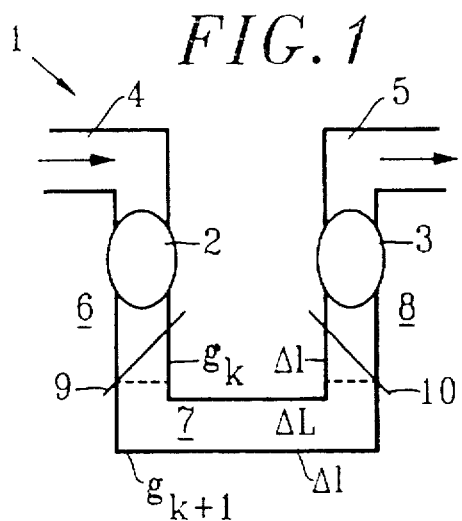
FIG. 1 is a diagrammatic view of a multi-wavelength filter constituting a first embodiment of the invention.

FIG. 1 shows a multi-wavelength filter 1 constituting a first embodiment of the invention. The filter comprises a bundle of n optical waveguides $g_1, \ldots, g_n$ of which only two consecutive waveguides $g_k$, $g_{k+1}$ are shown (in this case k lying in the range 1 to n-1) in order to clarify the drawing. This bundle of optical waveguides $g_1, \ldots, g_n$ interconnects two expansion zones 2 and 3 which are constituted in the present embodiment by plane slab waveguides. Slab waveguide 2 receives light from an optical waveguide 4 and shares it between the optical waveguides $g_1, \ldots, g_n$ of the bundle. These waveguides are organized in such a manner as to cause the light to follow different optical paths. The phase-shifted light waves leaving the optical waveguides $g_1, \ldots, g_n$ are recombined in the slab waveguide 3 where they interfere in application of the principle of Mach Zender interferometry. The light applied to the filter 1 by the light waveguide 4 is thus wavelength-filtered and leaves via at least one optical waveguide 5 for the purpose of being conveyed, for example, to a light receiver (not shown) or some other optical or opto-electronic component.

In accordance with the invention, in order to obtain polarization-independence for the filter, each optical waveguide $g_k$ (k lying in the range 1 to n in this case) has at least two portions of waveguide having different birefringences, which portions are interconnected by a mode matcher. More precisely, in the first embodiment of the invention, each optical waveguide $g_k$ has three waveguide portions extending over three zones given respective references 6, 7, and 8, and interconnected by transition zones 9 and 10. End zone 6 extends from the plane slab waveguide 2 to transition zone 9 and has an effective refractive index n and birefringence $B_2$. Intermediate zone 7 extends between transition zones 9 and 10, having an effective refractive index n' and birefringence $B_1$. End zone 8 extends between the transition zone 10 and the plane slab waveguide 3, having an effective refractive index n and birefringence $B_2$. Each transition zone 9 and 10 extends along a plane that intersects the bundle of optical waveguides $g_1, \ldots, g_n$ obliquely, as shown diagrammatically in FIG. 3.

Figure 2:
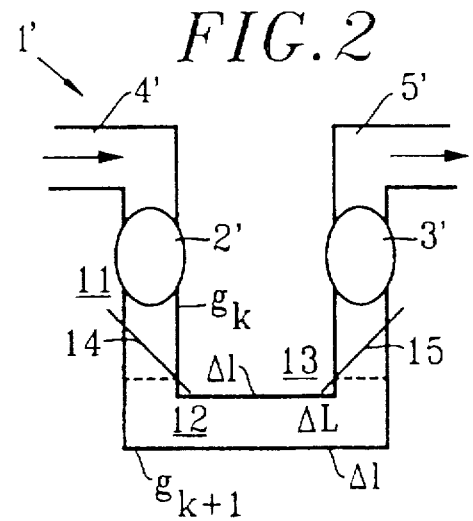
FIG. 2 is a diagrammatic view of a multi-wavelength filter constituting a second embodiment of the invention.

FIG. 2 shows a filter 1' in accordance with a second embodiment of the invention, comprising a bundle of optical waveguides $g_1, \ldots, g_n$ interconnecting two expansion zones 2' and 3'. Expansion zone 2' receives light via an optical waveguide 4' and shares it amongst the waveguides $g_1, \ldots, g_n$. The expansion zone 2' is constituted by a plane slab waveguide in the present example. At the outlet from the optical waveguides $g_1, \ldots, g_n$, light is collected by the expansion zone 3' which is connected to an optical waveguide 5'. The expansion zone 3' is constituted by a plane slab waveguide in the present example. Each optical waveguide $g_k$ of the bundle has three waveguide portions extending through respective zones 11, 12, and 13 that are interconnected by transition zones 14 and 15. More precisely, end zone 11 extends from the plane slab waveguide 2' to the transition zone 14, has an effective refractive index n' and a birefringence $B_1$. Intermediate zone 12 extends between the transition zones 14 and 15, having an effective refractive index n and a birefringence $B_2$. End zone 13 extends between transition zone 15 and the plane slab waveguide 3', presenting an effective refractive index n' and birefringence $B_1$.

In the description below, $\Delta L$ designates the pitch of the bundle of optical waveguides $g_1, \ldots, g_n$ in the filter 1 or 1', corresponding to the optical path length difference between two consecutive optical waveguides $g_k$ and $g_{k+1}$. $\Delta l$ designates the optical path length variation induced by a transition zone 9, 10, 14 or 15 on two consecutive waveguides $g_k$ and $g_{k+1}$. It will be observed that the transition zones 9 and 10 slope in the opposite directions to transition zones 14 and 15. In the embodiment of FIG. 1, each waveguide $g_{k+1}$ has greater path length ($2 \times \Delta l$ longer) in end zones 6 and 8 than waveguide $g_k$, whereas in the embodiment of FIG. 2, the opposite applies.

Polarization independence is obtained for the filters 1 and 1' when the following equation is true:

$$B_1 \Delta L + \Delta B \Delta l = 0 \quad (1)$$

where:
$\Delta B = B_2 - B_1$
The following relationships also apply:

$$\Delta l = -B_1 \Delta L / \Delta B \quad (2)$$

$$B_1 = (n'_{TE} - n'_{TM})/n' \quad (3)$$

and $$B_2 = (n_{TE} - n_{TM})/n \quad (4)$$

In accordance with the invention, light is transmitted via a mode matcher between two portions of an optical waveguide situated respectively in an end zone and in an intermediate zone, which mode matcher is situated where the waveguide concerned intersects the transition zone between said end zone and said intermediate zone, as explained below.

The multi-wavelength filters 1 and 1' are made after metal oxide chemical vapor deposition (MOCVD) of the following layers in a single step on a plane substrate 16 of InP binary material:

a 1 μm thick bottom confinement layer 17 of InP binary material;

a 0.1 μm thick bottom guide layer 18 of InGaAsP quaternary material having a forbidden band wavelength $\lambda_g$ equal to 1.3 μm, with a refractive index greater than that of the bottom confinement layer 17;

a 1 μm thick intermediate confinement layer 19 of InP binary material, with a refractive index less than that of the bottom guide layer 18;

a 0.1 μm thick intermediate guide layer 20 of InGaAsP quaternary material having a forbidden band wavelength $\lambda_g$ equal to 1.3 μm, with a refractive index greater than that of the intermediate confinement layer;

a 1 μm thick top confinement layer 21 of InP binary material, with a refractive index less than that of the intermediate guide layer 20; and a 0.65 μm thick top guide layer 22 of InGaAsP quaternary material, with a forbidden band wavelength $\lambda_g$ equal to 1.3 μm, with a refractive index greater than that of the top confinement layer 21.

After a mask has been formed in conventional manner, the optical waveguides 4 and 5 of the filter 1 are made by removing the top guide layer 22 and etching the top confinement layer 21 as a ribbon. Expansion zones 2 and 3 are made by removing the top guide layer 22 and by etching top confinement layer 21 from beside the optical waveguides 4 and 5, and adjacent to the bundle of optical waveguides $g_k$, by deeper etching down to the bottom guide layer 18. The portions of the optical waveguides $g_1, \ldots, g_k$ extending in the end zones 6 and 8 are made by removing the top guide layer 22 and by etching down to the bottom guide layer 18, and in the intermediate portion 7 they are made by etching the top guide layer 22 into the form of a ribbon and by deeper etching on either side of the ribbon down to the bottom guide layer 18.

In the end zones 6 and 8, the structure of the optical waveguides is of the "diluted" type, while in the intermediate zone 7, the structure of the optical waveguides is of the "single heterostructure" type. In the waveguide portions of diluted structure light propagates in a broad mode whereas in the waveguide portions that are of the single heterostructure type, light propagates in a narrow mode. The diluted type structure has an effective refractive index equivalent to the layers taken as a whole which is close to that of the substrate, and its birefringence is small (compared with the birefringence of a single heterostructure) being about $5 \times 10^{-3}$ in the embodiments described.

Figure 6:
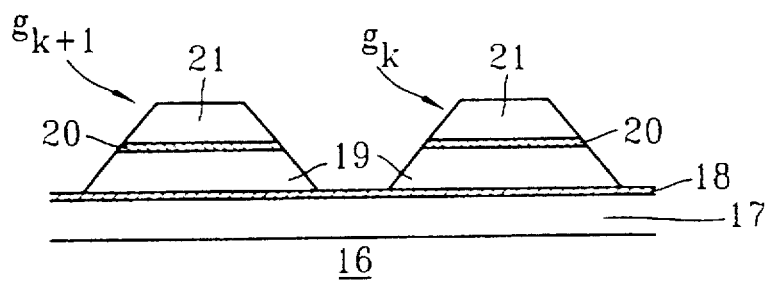
FIG. 6 is a section on section line VI—VI of FIG. 5.
Figure 7:
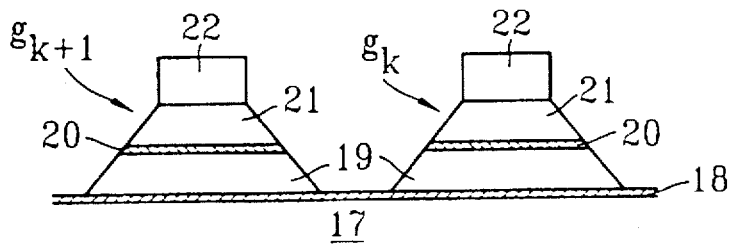
FIG. 7 is a section on section line VII—VII of FIG. 5.

Each optical waveguide $g_k$ in its end zones 6 and 8 is trapezium-shaped in section, tapering upwardly as shown in FIG. 6. The trapezium-shape improves the confinement of the light in bends. The intermediate confinement layer 19, the top guide layer 20, and the top confinement layer 21 taper upwards in width, going from a value of 9.6 µm at the bottom to a value of 4 µm at the top. Each optical waveguide $g_k$ is made in the intermediate zone 7 by etching a ribbon of the top guide layer 22, as can be seen more particularly in FIG. 8. The width of this ribbon is equal to 2 µm.

Figure 3:
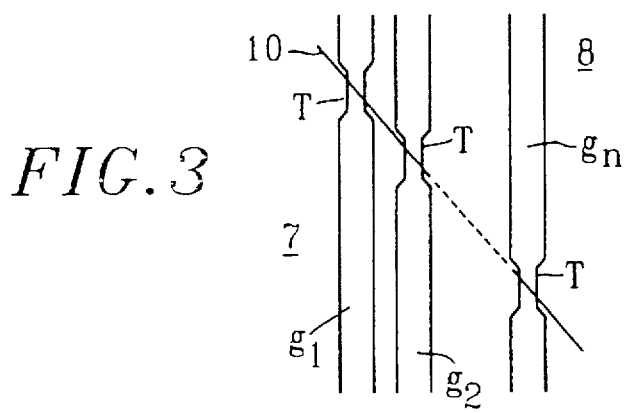
FIG. 3 is a view showing an embodiment detail of the multi-wavelength filter shown in FIG. 1.
Figure 4:
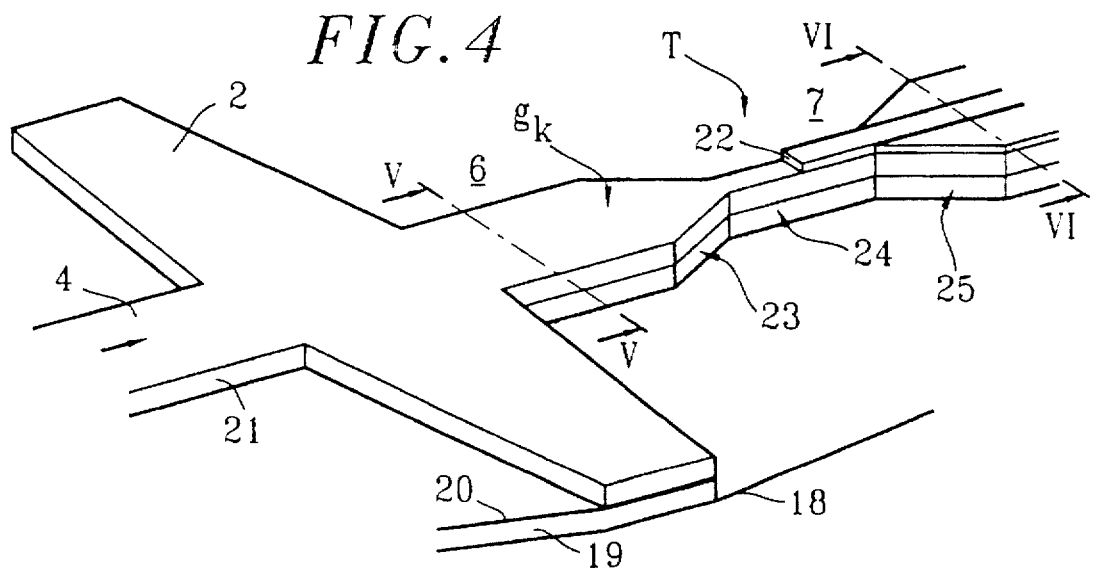
FIG. 4 is a diagrammatic perspective view showing a first embodiment of a mode matcher.
Figure 5:
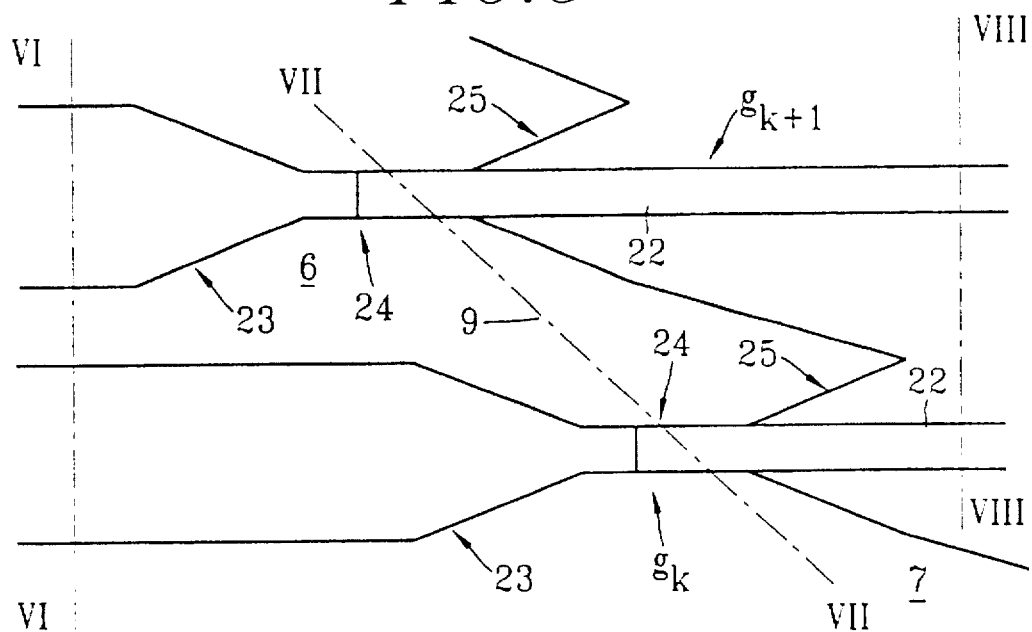
FIG. 5 is a view on a larger scale showing an implementation detail of the filter shown in FIG. 1.
Figure 8:
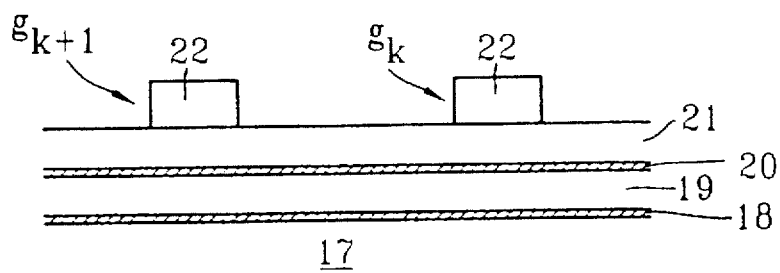
FIG. 8 is a section on section line VIII—VIII of FIG. 5.

To make the mode matcher T at the junction between an optical waveguide portion situated in an end zone 6 or 8 and an optical waveguide portion situated in the intermediate zone 7, the optical waveguide is etched to take up the shape of an hourglass, as shown in FIGS. 3, 4, and 5. The width of the optical waveguide situated in end zone 6 tapers linearly in a region referenced 23 down to 2 µm. Thereafter it is constant in a region referenced 24 constituting the middle portion of the hourglass. The ribbon etched in the guide layer 22 goes about halfway along said region 24. In said region, the ribbon 22 rests on a stack comprising the intermediate confinement layer 19, the intermediate guide layer 20, and the top confinement layer 21, each of which has a trapezium-shaped section that tapers upwardly. In a region 25, the width of the stack increases linearly towards intermediate zone 7. After enlargement, the layers on which the ribbons associated with each waveguide $g_1, \ldots, g_n$ in the intermediate layer 7 extend continuously beneath the ribbons, as shown in FIGS. 5 and 8.

Figure 9:
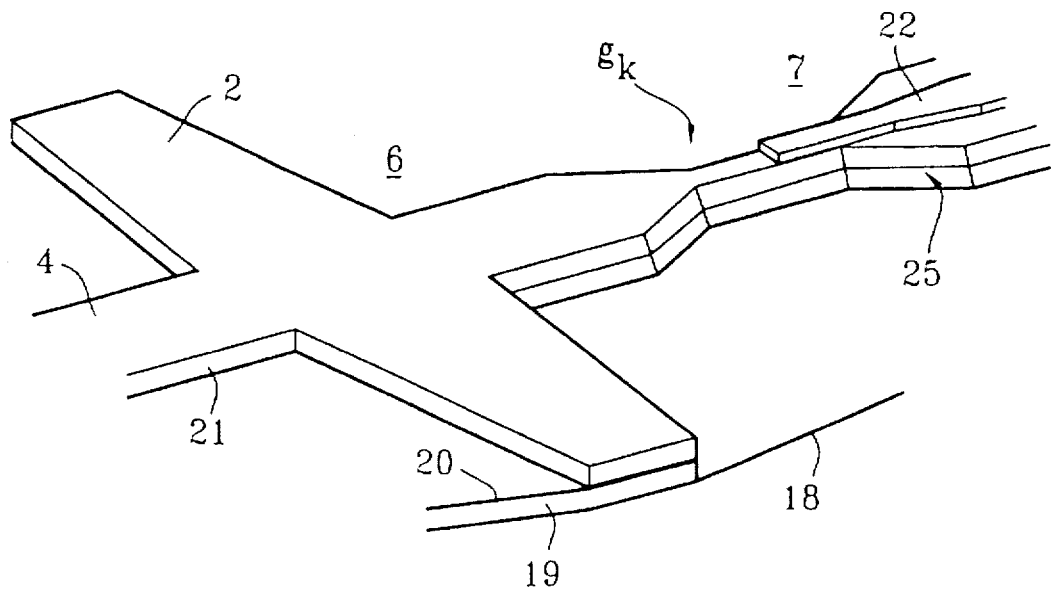
FIG. 9 is a diagrammatic perspective view of a second embodiment of a mode matcher.
Figure 10:
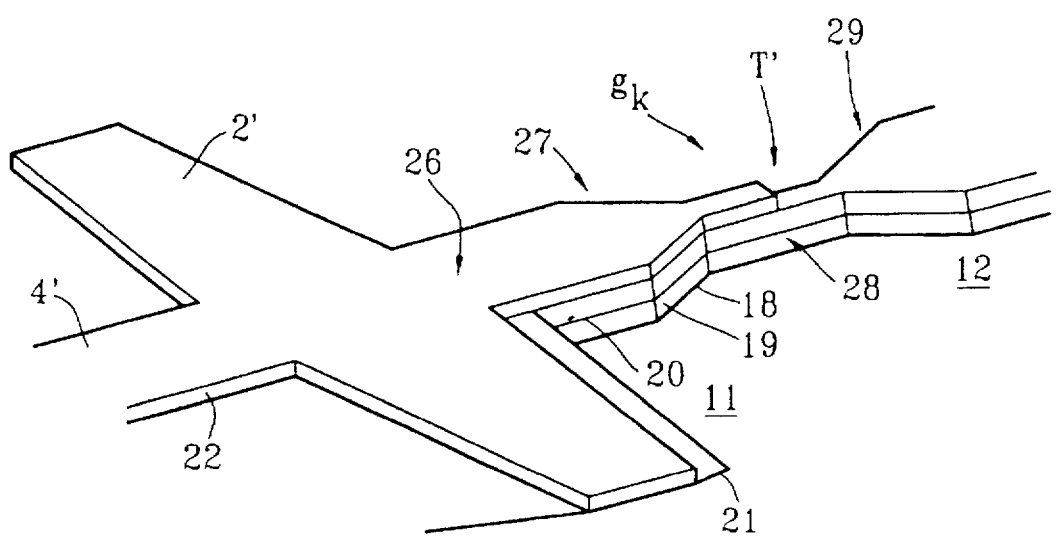
FIG. 10 is a diagrammatic perspective view of a third embodiment of a mode matcher.

FIG. 9 shows a variant embodiment of the mode matcher for a filter 1 in which the ribbon etched in the top guide layer 22 expands in the transition region 25 to reach 3 µm.

The optical waveguides 4' and 5' of the multi-wavelength filter 1' are made, after a mask has been formed, by etching the top guide layer 22 to form a ribbon. The expansion layers 2' and 3' are likewise made by etching the top guide layer 22. The optical waveguides $g_1, \ldots, g_n$ are made in their portions extending in the end zones 11 and 13 by etching the top guide layer 22 to form a ribbon in a region 26 adjacent to an expansion zone 2' or 3', and then by etching deeper down to the bottom guide layer 18 beyond said region 26, as can be seen in FIG. 9. In the intermediate zone 12, the optical waveguides $g_1, \ldots, g_n$ are made by removing the top guide layer 22 and etching down to the bottom guide layer 18.

Mode matchers T' are made between each waveguide portion extending in each end zone 11 or 13 and the waveguide portion extending in the intermediate zone 12. Each mode matcher T' is hourglass-shaped as shown in FIG. 9. More precisely, the width of the waveguide portion situated in an end zone 11 or 13 decreases linearly in a region referenced 27 so as to taper from 3 µm to 2 µm. Thereafter it is constant in a region that is referenced 28 which constitutes the central portion of the hourglass. The top guide layer 22 comes to an end about halfway along said region 28. The width of the stack of the intermediate confinement layer 19, the intermediate guide layer 20, and the top confinement layer 21 expands in a region referenced 29 so that in the example described it reaches a width of 4 µm in the intermediate zone 12 (4 µm measured at the top of the trapezium-shaped section).

Finally, the invention makes it possible to provide a multi-wavelength filter that is insensitive to polarization, and that is suitable for being integrated within a monolithic structure with other optical or opto-electronic components.

The configuration corresponding to FIG. 1, in which the intermediate zone 7 has a structure of the single heterostructure type and the end zones 6 and 8 have a structure of the diluted type presents the advantage of giving rise to a filter 1 of small bulk, because the width of the optical waveguide is smaller in their portions situated in the intermediate zone which is of the single heterostructure type than in their portions situated in the end zones of the diluted type.

The configuration corresponding to FIG. 2, in which the end zones 11, 13 are of a structure having the single heterostructure type and the intermediate zone 12 has a structure of the diluted type has the advantage of increasing the number of optical waveguides that can be coupled to the plane slab waveguides 2' and 3', likewise because the width of the optical waveguide is smaller when their structure is of the single heterostructure type.

Naturally, the invention is not limited to the embodiments described. In a variant, it is possible, in particular, to replace a structure of the diluted type by another structure having an effective refractive index (an equivalent index applicable to the set of layers) close to the index of the substrate, thereby obtaining small birefringence. It is also possible to bury the described filter structures in a material having a refractive index that is smaller than that of the guide layers, e.g. in InP.

We claim:

1. A multi-wavelength filter having a bundle of optical waveguides formed on a common substrate and organized in such a manner that the waveguide response of the filter depends on the phase shifting to which light is subject in the optical waveguides of the bundle, the filter being of the type in which insensitivity to polarization is obtained by varying the birefringence of the optical waveguides, each of which has at least two portions along its length that are of different birefringences, wherein said portions are connected together by a mode matcher.

2. A filter according to claim 1, wherein each optical waveguide of said bundle has two end zones of the same birefringence and an intermediate zone of birefringence different from that of the end zones, and wherein the sets of transitions in the bundle between the intermediate zones and the pairs of end zones extend along respective planes that are inclined relative to the propagation direction of the light along the waveguides.

3. A filter according to claim 1, wherein the mode matcher is hourglass-shaped.

4. A filter according to claim 1, wherein said waveguide portions interconnected by a mode matcher have structures respectively of the diluted type and of the single heterostructure type.

5. A filter according to claim 4, wherein said diluted type structure comprises a stack of the following layers:

a 1 µm thick bottom confinement layer of an InP binary material;

a 0.1 µm thick bottom guide layer, of an InGaAsP quaternary material, having a forbidden band wavelength $\lambda_g$ equal to 1.3 µm, with a refractive index greater than that of the bottom confinement layer;

a 1 µm thick intermediate confinement layer, of an InP binary material, with a refractive index less than that of the bottom guide layer;

a 0.1 µm thick intermediate guide layer, of InGaAsP quaternary material, having a forbidden band wavelength $\lambda_g$ equal to 1.3 µm, with a refractive index greater than that of the intermediate confinement layer; and a 1 µm thick top confinement layer, of an InP binary material, with a refractive index less than that of the intermediate guide layer.

6. A filter according to claim 5, wherein said stack of intermediate confinement layer, intermediate guide layer, and top confinement layer is etched so as to be trapezium-shaped in section in a section plane extending transversely to the light propagation direction, said section tapering upwards.

7. A filter according to claim 4, wherein the structure of the single heterostructure type comprises a stack of the following layers:

- a 1 μm thick bottom confinement layer of an InP binary material;
- a 0.1 μm thick bottom guide layer, of an InGaAsP quaternary material, having a forbidden band wavelength $\lambda_g$ equal to 1.3 μm, with a refractive index greater than that of the bottom confinement layer;
- a 1 μm thick intermediate confinement layer, of an InP binary material, with a refractive index less than that of the bottom guide layer;
- a 0.1 μm thick intermediate guide layer, of InGaAsP quaternary material, having a forbidden band wavelength $\lambda_g$ equal to 1.3 μm, with a refractive index greater than that of the intermediate confinement layer;
- a 1 μm thick top confinement layer, of an InP binary material, with a refractive index less than that of the intermediate guide layer; and
- a 0.65 μm thick top guide layer, of InGaAsP quaternary material, having a forbidden band wavelength $\lambda_g$ equal to 1.3 μm, with a refractive index greater than that of the top confinement layer.

8. A method of making a multi-wavelength filter having a bundle of optical waveguides of the type in which polarization insensitivity is obtained by varying the birefringence of the optical waveguides, which waveguides present at least two length portions of different birefringences, the method comprising the steps of:

depositing the following sequence of layers by epitaxy:

- a 1 μm thick bottom confinement layer of an InP binary material;
- a 0.1 μm thick bottom guide layer, of an InGaAsP quaternary material, having a forbidden band wavelength $\lambda_g$ equal to 1.3 μm, with a refractive index greater than that of the bottom confinement layer;
- a 1 μm thick intermediate confinement layer, of an InP binary material, with a refractive index less than that of the bottom guide layer;
- a 0.1 μm thick intermediate guide layer, of InGaAsP quaternary material, having a forbidden band wavelength $\lambda_g$ equal to 1.3 μm, with a refractive index greater than that of the intermediate confinement layer;
- a 1 μm thick top confinement layer, of an InP binary material, with a refractive index less than that of the intermediate guide layer; and
- a 0.65 μm thick top guide layer, of InGaAsP quaternary material, having a forbidden band wavelength $\lambda_g$ equal to 1.3 μm, with a refractive index greater than that of the top confinement layer;

making optical waveguides for feeding light to and taking light from the filter, by removing the top guide layer and by etching the top confinement layer into a ribbon;

making expansion zones connected by the bundle of optical waveguides by removing the top guide layer and by etching the top confinement layer adjacent to the bundle of optical waveguides and adjacent to the optical waveguides for feeding light to and taking light from the filter by deeper etching down to the bottom guide layer;

making optical waveguide portions extending into end zones, by removing the top guide layer and by etching down to the bottom guide layer;

making optical waveguide portions extending in an intermediate zone interconnecting said end zones, by etching the top guide layer to form a ribbon and by deeper etching to the bottom guide layer on either of the ribbons formed in said top guide layer; and etching mode matchers of hourglass-shape at the junctions between the waveguide portions situated respectively in an end zone and in the intermediate zone.

9. A method of making a multi-wavelength filter having a bundle of optical waveguides of the type in which polarization insensitivity is obtained by varying the birefringence of the optical waveguides, which waveguides present at least two length portions of different birefringences, the method comprising the steps of:

depositing the following sequence of layers by epitaxy:

- a 1 μm thick bottom confinement layer of an InP binary material;
- a 0.1 μm thick bottom guide layer, of an InGaAsP quaternary material, having a forbidden band wavelength $\lambda_g$ equal to 1.3 μm, with a refractive index greater than that of the bottom confinement layer;
- a 1 μm thick intermediate confinement layer, of an InP binary material, with a refractive index less than that of the bottom guide layer;
- a 0.1 μm thick intermediate guide layer, of InGaAsP quaternary material, having a forbidden band wavelength $\lambda_g$ equal to 1.3 μm, with a refractive index greater than that of the intermediate confinement layer;
- a 1 μm thick top confinement layer, of an InP binary material, with a refractive index greater than that of the intermediate guide layer; and
- a 0.65 μm thick top guide layer, of InGaAsP quaternary material, having a forbidden band wavelength $\lambda_g$ equal to 1.3 μm, with a refractive index greater than that of the top confinement layer;

making optical waveguides for feeding light to and taking light from the filter, by etching the top guide layer into a ribbon;

forming expansion zones interconnected by the optical waveguide bundle, by etching the top guide layer;

making optical waveguide portions extending in end zones, by etching the top guide layer in the regions adjacent to the expansion zones to form ribbons and then by etching deeper down to the bottom guide layer beyond said regions;

making optical waveguide portions extending in an intermediate zone interconnecting said end zones, by removing the top guide layer and etching down to the bottom guide layer; and etching mode matchers of hourglass-shape at the junctions between the waveguide portions situated in respective end zones and in the intermediate zone.

* * * * *